United States Patent
Nishizawa et al.

(10) Patent No.: US 6,268,892 B1
(45) Date of Patent: Jul. 31, 2001

(54) NON-PEALING ANTI-REFLECTIVE FILM FOR A CATHODE RAY TUBE AND METHOD OF MAKING THE SAME

(75) Inventors: Hiroshi Nishizawa; Akira Kondo, both of San Diego, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/387,739

(22) Filed: Sep. 1, 1999

Related U.S. Application Data

(60) Provisional application No. 60/130,248, filed on Apr. 21, 1999.

(51) Int. Cl.⁷ .................................................. H04N 5/72
(52) U.S. Cl. ........................ 348/834; 359/601; 359/609
(58) Field of Search ................................ 348/834, 835, 348/832, 833, 818; 359/601, 609, 614; 248/918–924; 428/425.6; 313/478, 479

(56) References Cited

U.S. PATENT DOCUMENTS

| | | | |
|---|---|---|---|
| 3,582,189 | * 6/1971 | Moritz et al. ........................ 348/834 |
| 4,945,282 | * 7/1990 | Kawamura et al. .................. 313/479 |
| 5,155,627 | * 10/1992 | Keehn et al. ........................ 348/834 |
| 5,396,148 | * 3/1995 | Endo et al. ........................... 313/479 |
| 5,519,458 | * 5/1996 | King et al. ........................... 348/834 |

* cited by examiner

Primary Examiner—Victor R. Kostak
(74) Attorney, Agent, or Firm—Ronald P. Kananen; Rader, Fishman & Grauer

(57) ABSTRACT

An anti-reflective film laminated on the display surface of a cathode ray tube which is not prone to pealing with age includes an extension on each of the four sides of the main film surface. The extensions from the main anti-reflective film surface are preferably rectangular and can be wrapped around the sides of the cathode ray tube adjacent to the display surface. A heat shrink band is then constricted around the cathode ray tube to fix the anti-reflective film in place. Strips of conductive material on the extensions of the anti-reflective film can be electrically connected to grounding electrodes on the heat shrink band to allow for the dissipation of static electricity which tends to accumulate on the anti-reflective film. With the heat shrink band securing the anti-reflective film in place over the display surface over the cathode ray tube, the anti-reflective film is not prone to pealing or separation from the display surface of the cathode ray tube.

17 Claims, 4 Drawing Sheets

NON-PEALING ANTI-REFLECTIVE FILM FOR A CATHODE RAY TUBE AND METHOD OF MAKING THE SAME

This application claims benefit of Provisional Application Ser. No. 60/130,248 filed Apr. 21, 1999.

FIELD OF THE INVENTION

The present invention relates to the field of cathode ray tube (CRT) manufacture. More particularly, the present invention relates to the field of applying anti-reflective films to the display surface of a CRT.

BACKGROUND OF THE INVENTION

Cathode ray tubes (CRT) are widely used as display devices. For example, most conventional television sets incorporate a cathode ray tube. Additionally, most conventional computer monitors also include a cathode ray tube.

A cathode ray tube commonly has a relatively flat broad bottom surface on which the television picture or computer image is displayed. Above the relatively flat display surface, the cathode ray tube narrows to a neck portion in which an electron source is disposed for firing a beam of electrons at the flat display surface. A layer of phosphor on the flat display surface responds to the beam of electrons by emitting light resulting in an image as viewed by the television viewer or computer user.

A common problem with cathode ray tubes is the reflection of ambient light from the display surface which obscures the image or picture being shown on the tube. In order to reduce such reflection or glare, an anti-reflective film is commonly adhered to the display surface of the cathode ray tube.

An exploded view of such a conventional cathode ray tube is illustrated in FIG. 1. As shown in FIG. 1, a heat shrink band (102) is applied around the display surface of the cathode ray tube (106). This band, when tightly fit about the cathode ray tube, provides additional support and strength to the tube in the area around the display surface. Within the heat shrink band (102) in place, the anti-reflective film (101) is adhered over the display surface of the cathode ray tube (106).

Prior to application of the anti-reflective film (101), the display surface of the cathode ray tube (106) is carefully cleaned. After the anti-reflective film (101) is laminated on the display surface of the cathode ray tube (106), the anti-reflective film (101) is carefully inspected for continuous adhesion to the cathode ray tube (106).

FIG. 2 illustrates the display surface of an assembled cathode ray tube. As shown in FIG. 2, the anti-reflective film (101) is framed within the heat shrink band (102). In order to allow for the discharge of static electricity that may accumulate on the anti-reflective film (101) during operation of the cathode ray tube (106), conductive tape (103) electrically connects the anti-reflective film (101) with grounding electrodes (104) on the heat shrink band (102).

The conductive tape (103) is commonly provided near the corners of the display surface of the cathode ray tube as illustrated in FIG. 2. The conductive tape may be made from, for example, copper, and is soldered onto the anti-reflective film.

FIG. 3 illustrates the anti-reflective film (101) without any other components being shown. The size of the conventional anti-reflective film (101) is essentially coextensive with the area framed in the interior of the heat shrink band (102).

While the anti-reflective film (101) substantially improves the ability of the cathode ray tube (106) to display high-quality images, there exists a significant problem. With time, the adhesive between the conventional anti-reflective film (101) and the cathode ray tube (106) begins to fail. Typically, this is initially manifested by pealing of the anti-reflective film (101) away from the display surface of the cathode ray tube (106). This pealing may create shadows or air pockets on the anti-reflective film (101). These features degrade the image being shown on the cathode ray tube (106). Eventually, the reflective film (101) will peal completely away from the cathode ray tube making it further difficult to use the cathode ray tube (106) as a display device.

Consequently, there is a need in the art for an improved anti-reflective film and method of making and applying the same that has an improved durability and is not liable to the pealing commonly observed in conventional anti-reflection coatings on cathode ray tubes.

SUMMARY OF THE INVENTION

It is an object of the present invention to meet the above-described needs and others. Specifically, it is an object of the present invention to provide an improved anti-reflective film, and method of making and applying the same, that is more durable and does not tend to peal away from the cathode ray tube to which it is adhered over time.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve these stated and other objects, the present invention may be embodied and described as an anti-reflective film for the display surface of a cathode ray tube formed of a planar anti-reflective film sized to cover the display surface of the cathode ray tube; and extensions extending from the edges of the planar anti-reflective film along the sides of the cathode ray tube when the planar anti-reflective film is in place on the display surface of the cathode ray tube. Preferably, the extensions are integral with the planar anti-reflective film and have a substantially rectangular shape.

A heat shrink band is disposed on the cathode ray tube around the display surface. The heat shrink band is placed over the extensions of the anti-reflective film along the sides of the cathode ray tube to secure the anti-reflective film over the display surface of the cathode ray tube.

Conductive material is preferably disposed on at least one of the extensions. An electrical connection can then be provided between the conductive material of the anti-reflective film extension and grounding electrodes on a heat shrink band of the cathode ray tube.

The present invention also encompasses a method of making a cathode ray tube with an anti-reflective film by constricting a heat shrink band around sides of the cathode ray tube such that the heat shrink band is disposed over an anti-reflective film which covers a display surface of the cathode ray tube and extends along sides of the cathode ray tube.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

Figure 4:
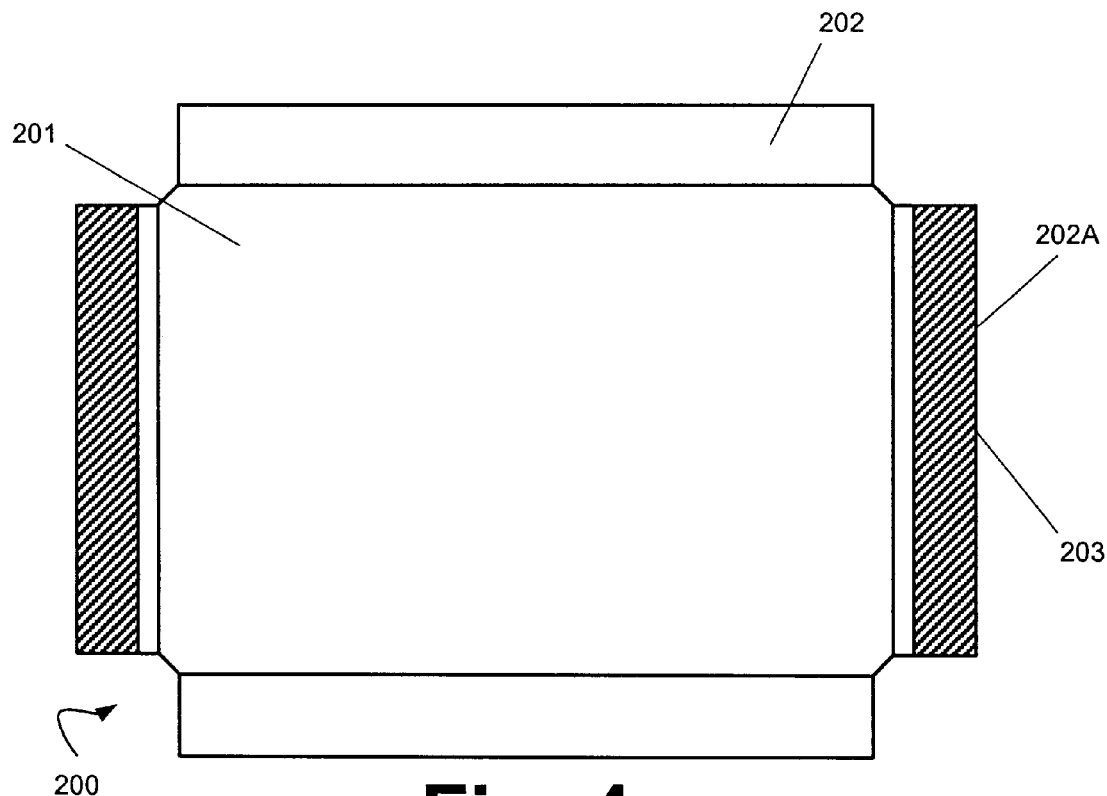
FIG. 4 is an illustration of an anti-reflective film according to the present invention.

Using the drawings, the preferred embodiments of the present invention will now be explained. FIG. 4 illustrates the structure of an anti-reflective film (200) according to the present invention. As shown in FIG. 4, the anti-reflective film (200) of the present invention includes an anti-reflective surface (201) which is to be disposed over the display surface of a cathode ray tube for preventing unwanted reflection and glare from that display surface during use.

In addition to this anti-reflective surface (201), the anti-reflective film (200) of the present invention includes extensions (202) which are preferably rectangular in shape and extend from each of the four sides of the anti-reflective surface (201).

Preferably, the anti-reflective film (200) of FIG. 4 is formed from a single integral sheet of anti-reflective material. In other words, the entire anti-reflective film (200) of the shape illustrated in FIG. 4, including the extensions (202), is taken from a single planar piece of anti-reflective material. Alternatively, however, the extensions (202) may be attached to the anti-reflective surface (201) to form the film (200) shown in FIG. 4.

Figure 5:
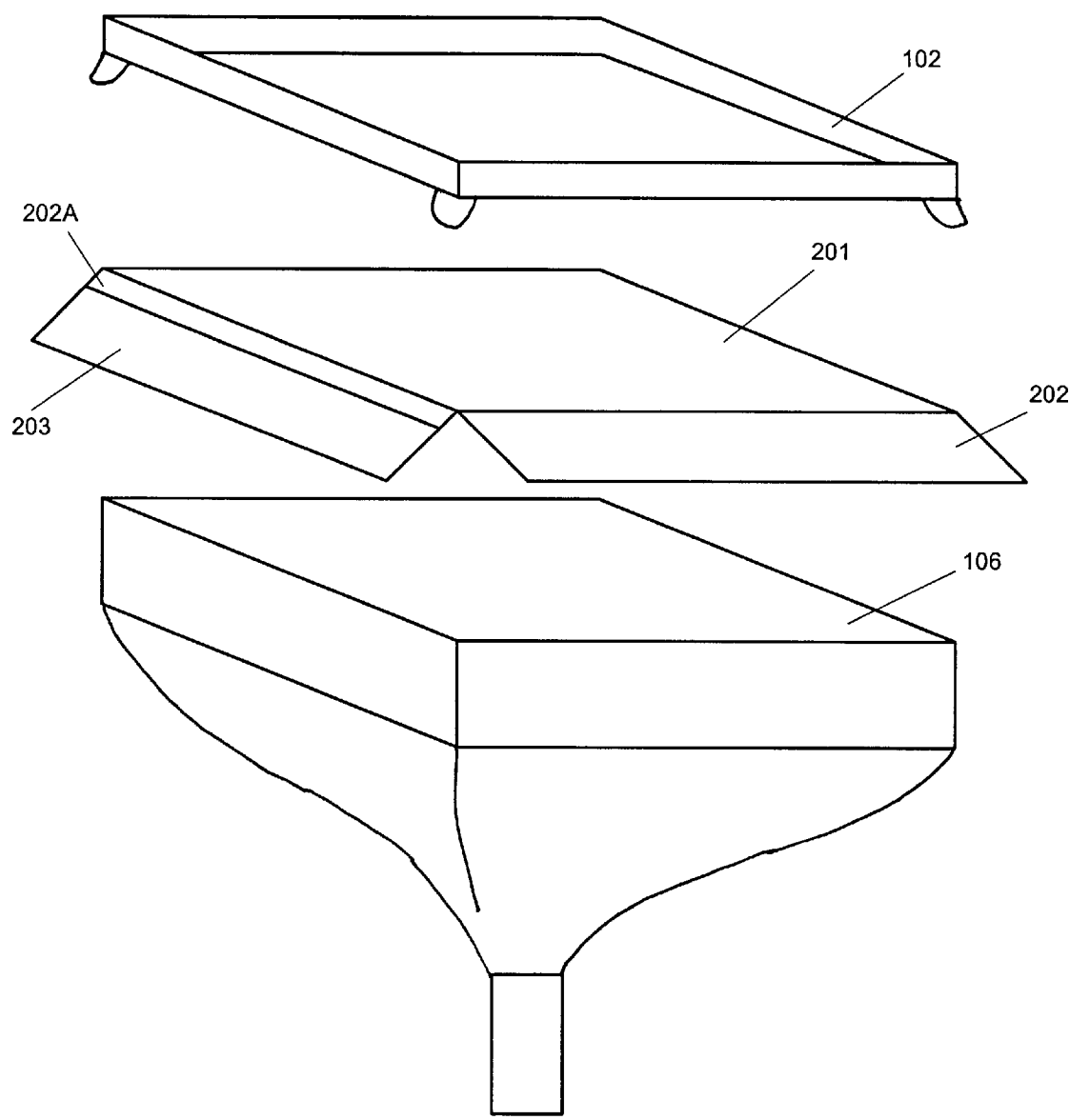
FIG. 5 is an exploded view of a cathode ray tube incorporating the anti-reflective coating of the present invention.

As shown in FIG. 5, according to the present invention, the anti-reflective film (200) is placed on the display surface of the cathode ray tube (106) before application of the heat shrink band (102). The extensions (202) of the anti-reflective film (200), are wrapped around the sides of the cathode ray tube (106) adjacent the display surface. The anti-reflective film (200) is mildly adhered to the cathode ray tube (106) to maintain the position of the anti-reflective film (200) on the cathode ray tube (106) until the heat shrink band (102) is applied.

The heat shrink band (102) is then placed around the display surface of the cathode ray tube (106). The extensions (202) of the anti-reflective film (200) are in contact with and underneath the heat shrink band (102). A heat treatment is then applied to cause the heat shrink band (102) to contract so as to tightly grip and support the area of the cathode ray tube (106) around its display surface. When the heat shrink band (102) contracts it will also effectively secure the anti-reflective film (200) in place over the display surface of the cathode ray tube (106). With the heat shrink band (102) holding the anti-reflective film (200) in place, the anti-reflective film (200) will not peal or separate from the cathode ray tube (106) as has been the problem in conventional cathode ray tubes.

Figure 1:
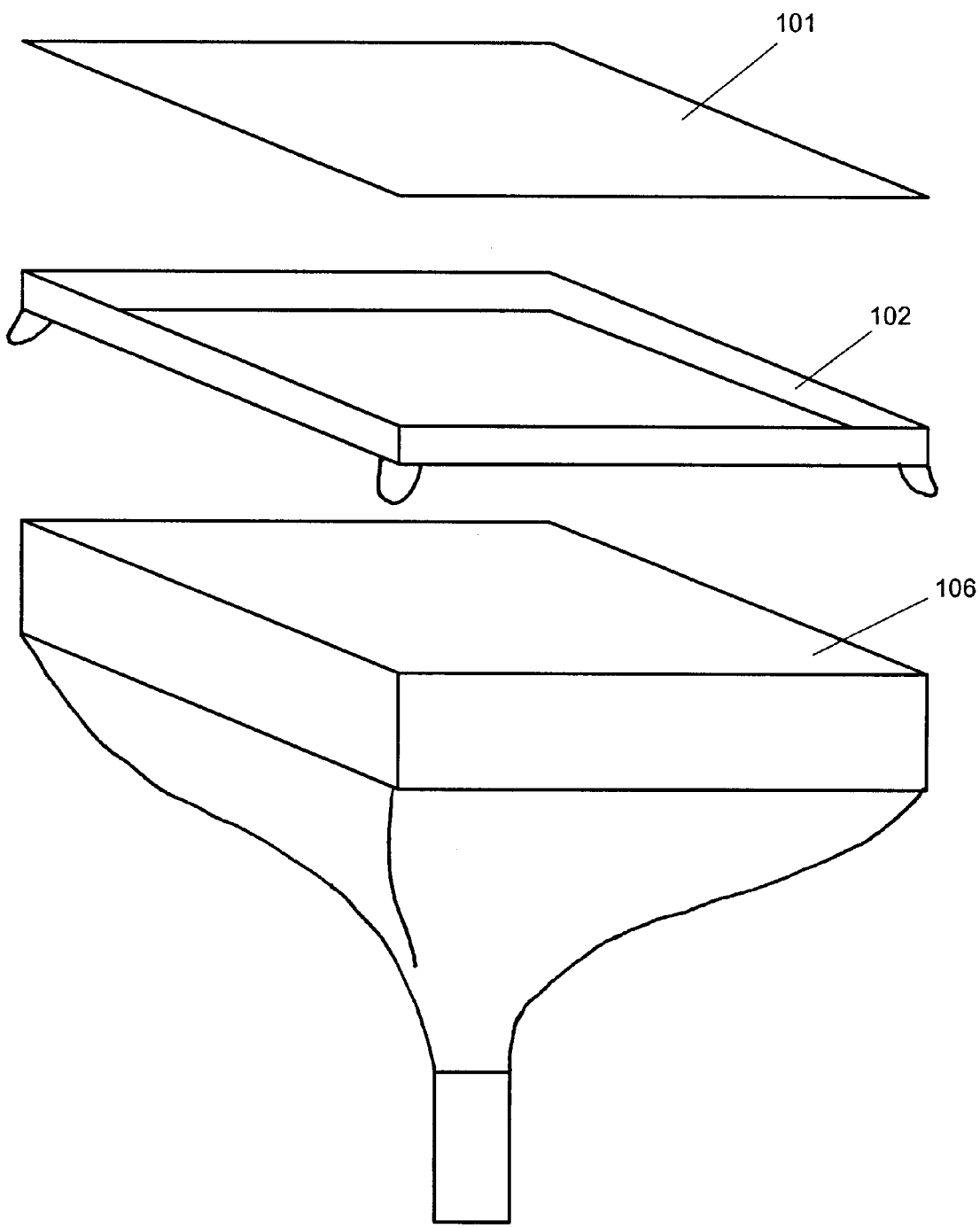
FIG. 1 is an exploded view of a cathode ray tube with an anti-reflective coating according to the prior art.
Figure 2:
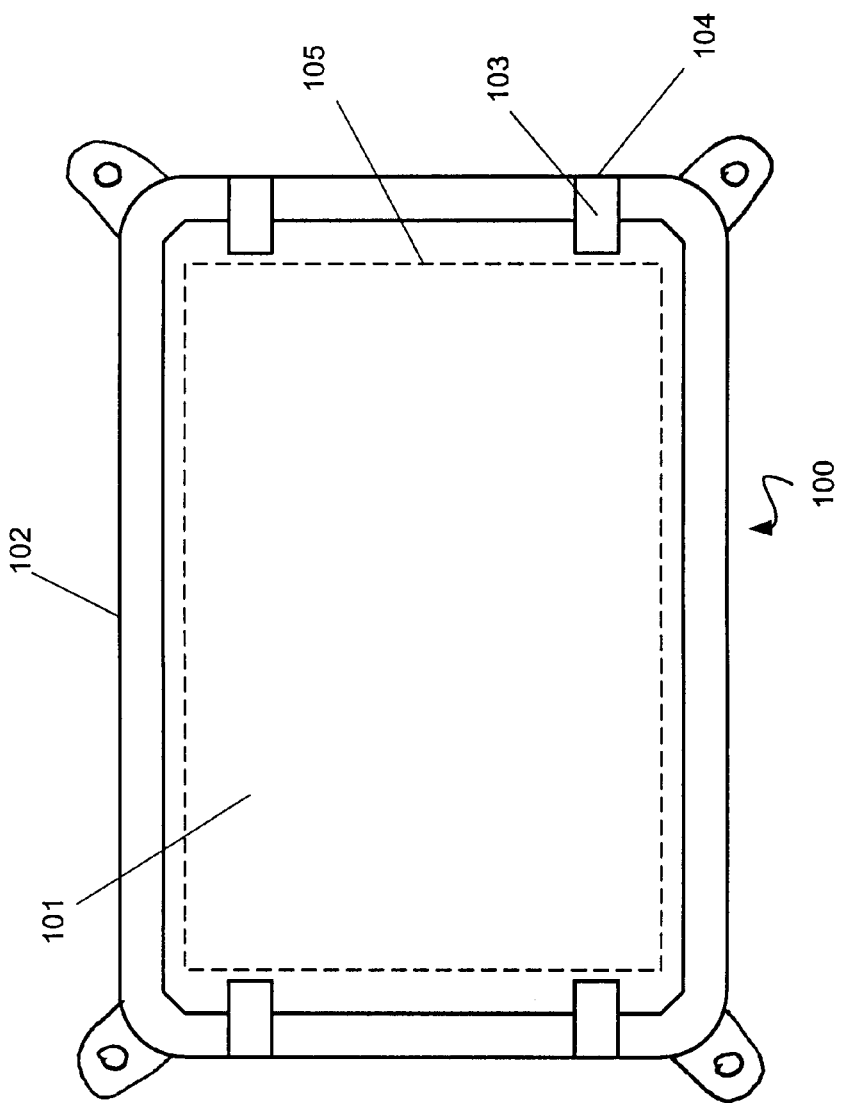
FIG. 2 is a detailed illustration of the display surface of the conventional cathode ray tube with anti-reflective coating.
Figure 3:
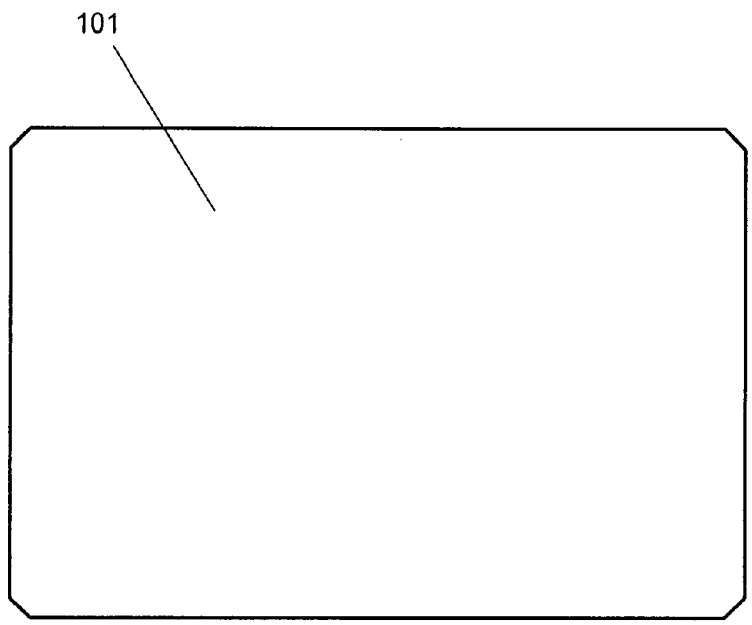
FIG. 3 is an illustration of a conventional anti-reflective coating.

An additional advantage of the anti-reflective film (200) of the present invention is the elimination of the conductive taping (103) as shown in FIG. 2. In place of the conductive taping (103) used in conventional anti-reflective cathode ray tubes. The anti-reflective film (200) of the present invention incorporates conductive strips of material (203) on, for example, the left and right side extensions (202A) of the anti-reflective film (200).

Once the anti-reflective film (200) is secured in place over the display surface of the cathode ray tube (106) by the heat shrink band (102), the strips of conductive material (203) can be electrically connected to the grounding electrodes (104) on the conventional heat shrink band (102). This allows for the appropriate discharge of static electricity that tends to collect on the ends of the anti-reflective film (200) in the same manner allowed by the conductive tape (103) of conventional anti-reflective cathode ray tube devices. Moreover, elimination of the taping (103) also eliminates the visual inspection of the tape that is typically required after its application.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. An anti-reflective film for the display surface of a cathode ray tube, comprising:
   a planar anti-reflective film that is physically detached from, and is sized to cover said display surface of said cathode ray tube; and
   a plurality of extensions extending from edges of said planar anti-reflective film in a direction that allows said plurality of extensions to fit along a plurality of sides of said cathode ray tube when said planar anti-reflective film is in place on said display surface of said cathode ray tube.

2. The anti-reflective film of claim 1, wherein said extensions are integral with said planar anti-reflective film.

3. The anti-reflective film of claim 1, wherein said plurality of extensions comprises four extensions, each of which extends from a different side of said planar anti-reflective film.

4. The anti-reflective film of claim 1, wherein each of said plurality of extensions has a substantially rectangular shape.

5. The anti-reflective film of claim 1, further comprising conductive material disposed on at least one of said extensions.

6. A cathode ray tube with an anti-reflective film, comprising:
   said anti-reflective film disposed on a display surface of said cathode ray tube;
   a plurality of extensions from said anti-reflective film which extend along sides of said cathode ray tube adjacent said display surface;
   conductive strips disposed on top of at least one of said extensions; and
   a heat shrink band disposed on said cathode ray tube around said display surface and over said extensions of said anti-reflective film.

7. The cathode ray tube of claim 6, wherein said extensions are integral with said planar anti-reflective film.

8. The cathode ray tube of claim 6, wherein said plurality of extensions comprises four extensions, each of which extends from a different side of said planar anti-reflective film.

9. The cathode ray tube of claim 6, wherein each of said plurality of extensions has a substantially rectangular shape.

10. A method of making a cathode ray tube with an anti-reflective film comprising:

preparing an anti-reflective film;

after said preparing step, covering a display surface of said cathode ray tube with said anti-reflective film; and constricting a heat shrink band around sides of said cathode ray tube, said heat shrink band being disposed over said anti-reflective film.

11. The method of claim 10 further comprising providing conductive material on portions of said anti-reflective film extending along one or more sides of said cathode ray tube.

12. The method of claim 11 further comprising electrically connecting said conductive material to at least one grounding electrode on said heat shrink band.

13. An anti-reflective means for the display surface of a cathode ray tube, comprising:

a planar anti-reflective means sized to cover said display surface of said cathode ray tube;

a plurality of extension means extending from edges of said planar anti-reflective means along sides of said cathode ray tube when said planar anti-reflective means is in place on said display surface of said cathode ray tube; and conductive means disposed on top of at least one of said extension means for discharging static electricity.

14. The anti-reflective means of claim 13, wherein said extension means are integral with said planar anti-reflective means.

15. The anti-reflective means of claim 13, wherein said plurality of extension means comprises four extensions, each of which extends from a different side of said planar anti-reflective means.

16. The anti-reflective means of claim 13, wherein each of said plurality of extension means has a substantially rectangular shape.

17. A display means with an anti-reflective means, comprising:

said anti-reflective means disposed on a display surface of said display means;

a plurality of extensions from said anti-reflective means which extend along sides of said display device adjacent said display surface;

a clamping means disposed on said display means around said display surface and over said extensions of said anti-reflective means; and conductive means, separated from said anti-reflective means by said plurality of extensions, disposed on at least one of said plurality of extensions.

* * * * *